(12) United States Patent
Yin et al.

(10) Patent No.: US 9,641,832 B2
(45) Date of Patent: May 2, 2017

(54) 3D DISPLAY CROSS INTERFERENCE TESTING METHOD AND TESTING DEVICE THEREOF

(71) Applicants: BOE TECHNOLOGY GROUP CO., LTD., Beijing (CN); BEIJING BOE DISPLAY TECHNOLOGY CO., LTD., Beijing (CN)

(72) Inventors: Xinshe Yin, Beijing (CN); Quanzhi Han, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 0 days.

(21) Appl. No.: 14/418,042

(22) PCT Filed: May 5, 2014

(86) PCT No.: PCT/CN2014/076805
§ 371 (c)(1),
(2) Date: Jan. 28, 2015

(87) PCT Pub. No.: WO2015/096346
PCT Pub. Date: Jul. 2, 2015

(65) Prior Publication Data
US 2015/0365663 A1    Dec. 17, 2015

(30) Foreign Application Priority Data
Dec. 27, 2013 (CN) .......................... 2013 1 0741665

(51) Int. Cl.
H04N 13/04      (2006.01)
H04N 17/04      (2006.01)

(52) U.S. Cl.
CPC ......... *H04N 17/04* (2013.01); *H04N 13/0422* (2013.01); *H04N 13/0425* (2013.01);
(Continued)

(58) Field of Classification Search
None
See application file for complete search history.

(56) References Cited

U.S. PATENT DOCUMENTS

| 2003/0112507 A1* | 6/2003 | Divelbiss ............. G02B 26/008 359/464 |
| 2012/0050498 A1 | 3/2012 | Jung et al. |
| 2012/0147138 A1* | 6/2012 | Yu .......................... G02B 27/26 348/43 |

FOREIGN PATENT DOCUMENTS

| CN | 102378040 A | 3/2012 |
| CN | 102404605 A | 4/2012 |

(Continued)

OTHER PUBLICATIONS

Chinese Office Action of Chinese Application No. 201310741665.3, mailed Feb. 16, 2015 with English translation.
(Continued)

*Primary Examiner* — Michael Teitelbaum
(74) *Attorney, Agent, or Firm* — Collard & Roe, P.C.

(57) ABSTRACT

The present disclosure relates to a testing method of a 3D display cross interference and the testing device thereof. The method according to the present disclosure comprises: acquiring a brightness of at least one first test image in a region where a left eye image is displayed in a display device and a brightness of at least one second test image in a region where a right eye image is displayed in the display device through a left eye lens or a right eye lens of stereo glasses; comparing the brightness of the acquired first test image and the brightness of the acquired second test image, and determining a cross interference value or a cross interference value range between the left eye image and the right eye image according to the comparison result, a grey scale value of the first test image and a grey scale value of the second test image. By using the method according to the embodiment of the present disclosure, the cross interference value or the cross interference value range between the left eye image and the right eye image of the stereo display system is able to be tested quickly so that the processing (Continued)

speed and efficiency of the cross interference test are enhanced.

20 Claims, 3 Drawing Sheets

(52) U.S. Cl.
CPC ......... *H04N 13/0429* (2013.01); *H04N 13/04* (2013.01); *H04N 2213/008* (2013.01)

(56) References Cited

FOREIGN PATENT DOCUMENTS

| | | |
|---|---|---|
| CN | 102572458 A | 7/2012 |
| CN | 103686162 A | 3/2014 |
| EP | 2 136 232 A1 | 12/2009 |

OTHER PUBLICATIONS

International Search Report and Written Opinion of the International Searching Authority with Notice of Transmittal of the International Search Report and Written Opinion of PCT/CN2014/076805 in Chinese, mailed Sep. 3, 2014.

English translation of the International Preliminary Report on Patentability and Written Opinion of the International Searching Authority of PCT/CN2014/076805, issued Jun. 28, 2016.

\* cited by examiner

3D DISPLAY CROSS INTERFERENCE TESTING METHOD AND TESTING DEVICE THEREOF

CROSS REFERENCE TO RELATED APPLICATIONS

This application is the National Stage of PCT/CN2014/076805 filed on May 5, 2014, which claims priority under 35 U.S.C. 5119 of Chinese Application No. 201310741665.3 filed on Dec. 27, 2013, the disclosure of which is incorporated by reference.

FIELD

The present disclosure relates to a 3D displaying cross interference testing method and the testing device thereof.

BACKGROUND

With the development of the computer information technology and the display technology, 3D display technology has become a research focus in the display field. When human eyes are looking at a normal object, for the same scene, the left eye and right eye of the viewer receive images respectively. Due to the position variation of the pupil distance between two eyes of the viewer, two images with a slight variation appear on the retinas of the left eye and right eye of the viewer, which is called "binocular parallax". The two images with the slight variation construct a "stereo image pair". This principle is used by 3D (three-dimension) technology. For the same scene, a left eye image and a right eye image are made by photography. Upon displaying, the left eye image is only sent to the left eye of the viewer and the right eye image is only sent to the right eye of the viewer so that the "stereo image pair" is formed. After the "stereo image pair" is combined by the brain visual cortex, the stereo effect is formed, as illustrated in FIG. 1.

During the photography of the stereo image pairs, the left eye image and the right eye imaged are taken by two video cameras at different angles, and displayed on a screen by a playing device. Therefore, an overlapping image of the left eye image and the right eye image appears on the screen. When the viewer is watching the 3D image, by means of the filtering of polarized glasses or shutter glasses, the left eye image is sent to the left eye of the viewer and the right eye image is sent to the right eye of the viewer, which are combined by the brain visual cortex so that the stereo image is formed.

Ideally, the left eye of the viewer can only see the left eye image and the right eye of the viewer can only see the right eye image through stereo glasses. However, in reality, in either a beam division method of the polarized glasses or a time division method of the shutter glasses, an interference of the left eye image to the right eye image and an interference of the right eye image to the left eye occur, which is called a cross interference between the left eye image and right eye image displaying in the 3D display. The cross interference is an important factor determining the image quality of a stereo display system (including display device and stereo glasses). A severe cross interference will make it difficult to form the stereo image and cause a distortion so that the viewer has various degrees of asthenopia. Therefore, during the fabricating of the stereo display system, it is important to analyze and test the cross interference of the stereo display system. Delayed responses caused by various factors such as a image signal, a backlight, a display panel, stereo glasses will introduce the cross interference between the left and right eye image.

SUMMARY

The embodiment of the present disclosure provides a testing method of a 3D display cross interference and the testing device thereof.

The testing method according to the embodiment of the present disclosure comprises: acquiring a brightness of at least one first test image in a region where a left eye image is displayed in a display device and a brightness of at least one second test image in the region where a right eye image is displayed in a display device through a left eye lens or a right eye lens of stereo glasses; comparing the brightness of the acquired first test image and the brightness of the acquired second test image, and determining a cross interference value or a cross interference value range between the left eye image and the right eye image according to the comparison result, a grey scale value of the first test image and a grey scale value of the second test image.

In one example, one first test image corresponds to one second test image, and both first test image and second test image corresponding to the first test image are line shape image or bar shape image with a single grey scale.

In the example, the first test image and the second test image corresponding to the first test image are arranged side by side and adjacent to each other in a same horizontal direction.

In one example, in case where a cross interference of the left eye image to the right eye image is tested, one first test image corresponds to a plurality of second test images, each first test image is a bar shape image with a single grey scale, each second test image in the plurality of second test images corresponding to the first test image is a bar shape image with a single grey scale different from each other. In case where a cross interference of the right eye image to the left eye image is tested, one second test image corresponds to a plurality of first test images, each second test image is a bar shape image with a single grey scale, each first test image in the plurality of first test images corresponding to the second test image is a bar shape image with a single grey scale different from each other.

In the example, in case where the cross interference of the left eye image to the right eye image is tested, the plurality of second test images corresponding to the first test image are arranged side by side and adjacent to each other in a same vertical direction, and each first test image and the plurality of second test images corresponding to the first test image are arranged side by side and adjacent to each other in a same horizontal direction, the first test image has a length in the vertical direction equal to a sum of lengths of the plurality of second test images corresponding to the first test image in the vertical direction. In case where the cross interference of the right eye image to the left eye image is tested, the plurality of first test images corresponding to the second test image are arranged side by side and adjacent to each other in a same vertical direction, and each second test image and the plurality of first test images corresponding to the second test image are arranged side by side and adjacent to each other in a same horizontal direction, the second test image has a length in the vertical direction equal to a sum of lengths of the plurality of first test images corresponding to the second test image in the vertical direction.

In the example, in case where the cross interference of the left eye image to the right eye image is tested, the brightness of the acquired first test image and each second test image in the plurality of second test images are compared respectively, and a plurality of cross interference values from the left eye image to the right eye image are determined according to the comparison result, the grey scale value of the first test image and various grey scale values of the second test images corresponding to the first test image, and a final cross interference value or a final cross interference value range is determined according to the plurality of cross interference values. In case where the cross interference of the right eye image to the left eye image is tested, the brightness of the acquired second test image and each first test image in the plurality of first test images are compared respectively, and a plurality of cross interference values from the right eye image to the left eye image are determined according to the comparison result, the grey scale value of the second test image and various grey scale values of the first test images corresponding to the second test image, and a final cross interference value or a final cross interference value range is determined according to the plurality of cross interference values.

Based on the above two examples, in case where the cross interference of the left eye image to the right eye image is tested, for the one first test image and each second test image corresponding to the first test image, determining cross interference value or cross interference value range between the left eye image and the right eye image includes: in case where the brightness of the first test image is higher than that of the second test image, the cross interference value from the left eye to the right eye image is determined as being greater than $$\frac{N}{M}\%;$$

in case where the brightness of the first test image is equal to that of the second test image, the cross interference value from the left eye to the right eye image is determined as being equal to $$\frac{N}{M}\%;$$

in case where the brightness of the first test image is lower than that of the second test image, the cross interference value from the left eye to the right eye image is determined as being smaller than $$\frac{N}{M}\%,$$

where M is the grey scale value of the first test image, N is the grey scale value of the second test image and M≥N.

In case where the cross interference of the right eye image to the left eye image is tested, for the one second test image and each first test image corresponding to the second test image, determining cross interference value or cross interference value range between the left eye image and the right eye image includes: in case where the brightness of the first test image is higher than that of the second test image, the cross interference value from the left eye to the right eye image is determined as being smaller than $$\frac{M}{N}\%;$$

in case where the brightness of the first test image is equal to that of the second test image, the cross interference value from the left eye to the right eye image is determined as being equal to $$\frac{M}{N}\%;$$

in case where the brightness of the first test image is lower than that of the second test image, the cross interference value from the left eye to the right eye image is determined as being greater than $$\frac{M}{N}\%,$$

where M is the grey scale value of the first test image, N is the grey scale value of the second test image and M≤N.

The testing device of the 3D display cross interference according to the embodiment of the present disclosure comprises: an acquiring unit, designed for acquiring a brightness of at least one first test image in a region where a left eye image is displayed in a display device and a brightness of at least one second test image in the region where a right eye image is displayed in a display device through a left eye lens or a right eye lens of stereo glasses; and a processing unit, designed for comparing the brightness of the acquired first test image and the brightness of the acquired second test image and determining a cross interference value or a cross interference value range between the left eye image and the right eye image according to the comparison result, a grey scale value of the first test image and a grey scale value of the second test image.

In one example, one first test image corresponds to one second test image, and both each first test image and the second test image corresponding to the first test image are line shape image or bar shape image with a single grey scale.

Based on the above example, the first test image and the second test image corresponding to the first test image are arranged side by side and adjacent to each other in a same horizontal direction.

In a second example, in case where a cross interference of the left eye image to the right eye image is tested, one first test image corresponds to a plurality of second test images, each first test image is a bar shape image with a single grey scale, each second test image in the plurality of second test images corresponding to the first test image is a bar shape image with a single grey scale different from each other. In case where a cross interference of the right eye image to the left eye image is tested, one second test image corresponds to a plurality of first test images, each second test image is a bar shape image with a single grey scale, each first test image in the plurality of first test images corresponding to the second test image is a bar shape image with a single grey scale different from each other.

Based on the above second example, in case where the cross interference of the left eye image to the right eye image is tested, the plurality of second test images corresponding to the first test image are arranged side by side and adjacent to each other in a same vertical direction, and each first test image and the plurality of second test images corresponding to the first test image are arranged side by side and adjacent to each other in a same horizontal direction, the first test image has a length in the vertical direction equal to a sum of lengths of the plurality of second test images corresponding to the first test image in the vertical direction. In case where the cross interference of the right eye image to the left eye image is tested, the plurality of first test images corresponding to the second test image are arranged side by side and adjacent to each other in a same vertical direction, and each second test image and the plurality of first test images corresponding to the second test image are arranged side by side and adjacent to each other in a same horizontal direction, the second test image has a length in the vertical direction equal to a sum of lengths of the plurality of first test images corresponding to the second test image in the vertical direction.

Based on the above second example, in case where the cross interference of the left eye image to the right eye image is tested, the processing unit is so designed that the brightness of the acquired first test image and each second test image in the plurality of second test images are compared respectively, and a plurality of cross interference values of the left eye image to the right eye image are determined according to the comparison result, the grey scale value of the first test image and various grey scale values of the second test images corresponding to the first test image, and a final cross interference value or a final cross interference value range of the left eye image to the right eye image is determined according to the plurality of cross interference values. In case where the cross interference of the right eye image to the left eye image is tested, the processing unit is so designed that the brightness of the acquired second test image and each first test image in the plurality of first test images are compared respectively, and a plurality of cross interference values of the right eye image to the left eye image are determined according to the comparison result, the grey scale value of the second test image and various grey scale values of the first test images corresponding to the second test image, and a final cross interference value or a final cross interference value range of the right eye image to the left eye image is determined according to the plurality of cross interference values.

Based on the above two examples, in case where the cross interference of the left eye image to the right eye image is tested, for the one first test image and each second test image corresponding to the first test image, the processing unit is so designed that: in case where the brightness of the first test image is higher than that of the second test image, the cross interference value from the left eye to the right eye image is determined as being greater than $$\frac{N}{M}\%;$$

in case where the brightness of the first test image is equal to that of the second test image, the cross interference value from the left eye to the right eye image is determined as being equal to $$\frac{N}{M}\%;$$

in case where the brightness of the first test image is lower than that of the second test image, the cross interference value from the left eye to the right eye image is determined as being smaller than $$\frac{N}{M}\%,$$

where M is the grey scale value of the first test image, N is the grey scale value of the second test image and M≥N.

In case where the cross interference of the right eye image to the left eye image is tested, for the one second test image and each first test image corresponding to the second test image, the processing unit is so designed that: in case where the brightness of the first test image is higher than that of the second test image, the cross interference value from the left eye to the right eye image is determined as being smaller than $$\frac{M}{N}\%;$$

in case where the brightness of the first test image is equal to that of the second test image, the cross interference value from the left eye to the right eye image is determined as being equal to $$\frac{M}{N}\%;$$

in case where the brightness of the first test image is lower than that of the second test image, the cross interference value from the left eye to the right eye image is determined as being greater than $$\frac{M}{N}\%,$$

where M is the grey scale value of the first test image, N is the grey scale value of the second test image and M≤N.

In the embodiment of the present disclosure, the brightness of at least one first test image in the region where the left eye image is displayed in the display device and the brightness of at least one second test image in the region where the right eye image is displayed in the display device are acquired through the left eye lens or the right eye lens of stereo glasses; the brightness of the acquired first test image and the brightness of the acquired second test image are compared, and the cross interference value or the cross interference value range between the left eye image and the right eye image is determined according to the comparison result, the grey scale value of the first test image and the grey scale value of the second test image. Since no large amount of data operations is needed in the embodiments of the present disclosure, the cross interference value or the cross interference value range between the left eye image and the right eye image of the stereo display system can be tested quickly, so that it can be determined whether the cross interference value or the cross interference value range between the left eye image and the right eye image of the stereo display system meets the specification, which in turn improves the processing speed and efficiency of the cross interference test.

DESCRIPTION OF THE EMBODIMENTS

The technical solution of the embodiments of the present disclosure will be described clearly and fully in connection with the drawings of the embodiments of the present disclosure. It is obvious that the described embodiments are just a part but not all of the embodiments of the present disclosure. Based on the described embodiments of the present disclosure, those skilled in the art can obtain all other embodiment without any inventive work, which all fall into the scope of the claimed invention.

Unless otherwise defined, technical terms or scientific terms used herein shall have a common meaning known by those skilled in the art of the present disclosure. Words and expressions such as "first", "second" and the like used in the description and claims of the patent application of the present disclosure do not indicate any sequence, quantity or significance, but for distinguishing different components. Likewise, words such as "a", "an" and the like do not indicate quantitative restrictions, but indicate the presence of at least one. Words such as "connected", "connecting" and the like are not restricted to physical or mechanical connections, but may include electrical connections, regardless of direct or indirect connections. Words such as "up", "below", "left", "right", etc., are only used to indicate relative positional relationship, and will change correspondingly with change of the absolute position of the described object changes.

Currently, no unified standard is established for a testing method and testing device of 3D cross interference. A method of testing the cross interference known by the applicant is described as following. A testing device used in the testing method includes a signal source for output testing signal and an optical measuring device for measuring brightness value of respective test point. The signal source is connected to a display device which opposes the optical measuring device. Based on the above testing device, the testing method of 3D cross interference between the left image and right eye image in a stereo display system comprises following steps:

(a) A left eye lens of the stereo glasses is mounted on the optical measuring device and the display device and the stereo glasses are preheated.

Figure 1:
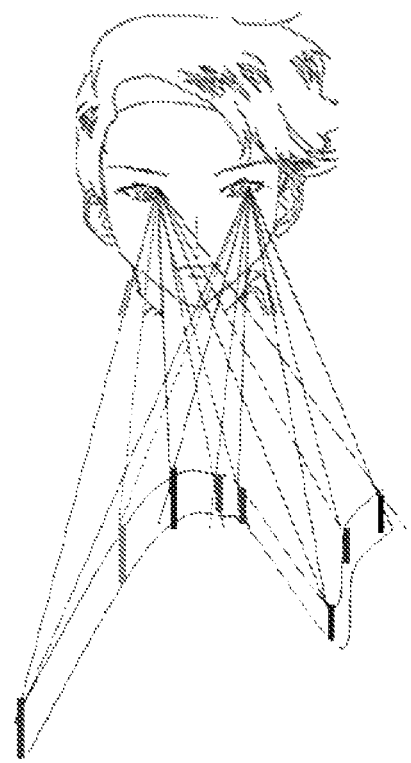
FIG. 1 is a schematic diagram of stereo imaging.
Figure 2:
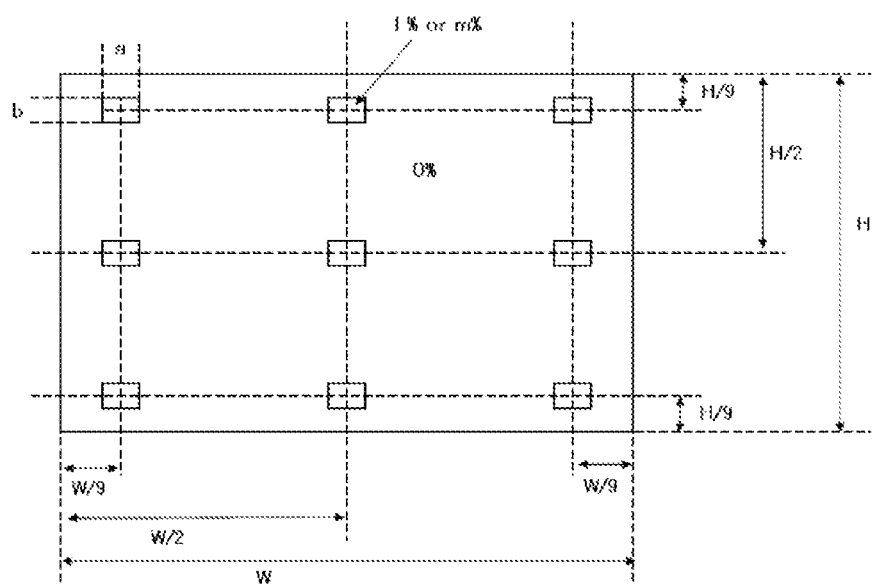
FIG. 2 is a schematic view of testing signal for a cross interference test.

(b) 9 test points ($P_0$~$P_8$) are selected on the display device, as illustrated in FIG. 2. H is a screen height of the display device, W is a screen width of the display device, and a and b are window width and window height of a test point, respectively, for example, a=W/30, b=H/30.

(c) Input electrical level of a measuring side (the measuring side is the left eye image side in a case where the left eye lens is mounted) of the 9 test points is configured as l % (for example, l is 0, 25, 50, 75 or 100, respectively), and the input electrical level of a cross interference side (the cross interference side is the right eye image side in a case where the left eye lens is mounted) of the 9 test points is configured as m % (for example, m is 0, 25, 50, 75 or 100, respectively). According to the different combinations of l and m values, the electrical levels of the measuring side and the cross interference side images are set respectively and the brightness in each window of the test points $P_0$~$P_8$ is tested respectively, and all the measurement values are recorded as brightness of the left eye images $L_{L0,l-m}$~$L_{L8,l-m}$. For example, firstly, the input electrical level of the measuring side is configured as l=0 and the input electrical level of the cross interference side is configured as m=0, that is, the input signals of the measuring side and the cross interference side are the signal of a black image, and they are recorded as a measurement value of a black field brightness of the combined left eye image; then the input electrical level m is switched to a next value with the input electrical level of the measuring side kept unchanged, and the measurement and recording are repeated for all m. Then, the input electrical level l is switched to a next value with the input electrical level of the cross interference side kept unchanged, and the measurement and recording are repeated for all l. The brightness values of all left eye images $L_{L0,l-m}$~$L_{L8,l-m}$ are acquired eventually.

(d) A right eye lens of the stereo glasses is mounted on the optical measuring device, the steps of (b) and (c) are performed, and brightness values of all right eye images $L_{R0,l-m}$~$L_{R8,l-m}$ are tested and recorded.

The $L_{L0,l-m}$~$L_{L8,l-m}$ and $L_{R0,l-m}$~$L_{R8,l-m}$ acquired as above are analyzed and calculated. The analyzing method comprises, for example, following steps.

1) Double eyes cross interferences $X_{Pi,RtoL,m-l}$ and $X_{Pi,LtoR,m-l}$ are calculated, in particular with reference to formula A1 and formula A2:

$$X_{Gi,RtoL,m-l} = \frac{L_{Li,l-m} - L_{Li,l-l}}{L_{Li,100-100} - L_{Li,0-0}} \times 100\%; \quad \text{Formula A1}$$

$$X_{Gi,LtoR,m-l} = \frac{L_{Ri,l-m} - L_{Ri,l-l}}{L_{Ri,100-100} - L_{Ri,0-0}} \times 100\%; \quad \text{Formula A2}$$

where $L_{Li,100-100}$ and $L_{Ri,100-100}$ are brightness values of a white field corresponding to the left eye and the right eye images, respectively, $L_{Li,0-0}$ and $L_{Ri,0-0}$ are brightness values of a black field corresponding to the left eye and the right eye images, respectively, the subscript index Gi represents a Grey-to-Grey at the test point Pi (i=0~8).

2) Absolute average values of the double eyes cross interference $X_{Pi,RtoL,m-l}$ and $X_{Pi,LtoR,m-l}$ are calculated, in particular with reference to formula B1 and formula B2:

$$X_{Gi,RtoL} = \frac{1}{n}\left|\sum X_{Gi,RtoL,l-m}\right|; \quad \text{Formula B1}$$

$$X_{Gi,LtoR} = \frac{1}{n}\left|\sum X_{Gi,LtoR,l-m}\right|; \quad \text{Formula B2}$$

where n is a number of combinations of l and m except the case where l=m. For example, when l and m have the above 5 values, the number of combinations of l and m except the case where l=m is 20.

3) The left and right eye cross interference is calculated, in particular with reference to formula C1 and formula C2:

$$X_{GLave} = \frac{1}{9}\sum X_{Gi,RtoL};$$ Formula C1

$$X_{GRave} = \frac{1}{9}\sum X_{Gi,LtoR};$$ Formula C2

4) A standard deviation is calculated, in particular with reference to formula D1 and formula D2:

$$X_{GL} = \sqrt{\frac{1}{9}\sum(X_{Gi,RtoL} - X_{GLave})^2};$$ Formula D1

$$X_{GR} = \sqrt{\frac{1}{9}\Sigma(X_{Gi,LtoR} - X_{GRave})^2};$$ Formula D2

5) Maximum cross interference values between the left and right eye images in the 9 test points are calculated in particular with reference to formula D1 and formula D2:

$$X_{GLmax} = \max(X_{Gi,RtoL})$$ Formula E1;

$$X_{GRmax} = \max(X_{Gi,LtoR})$$ Formula E2;

6) The specific conditions and measurement values of brightness are recorded on a testing record.

For example, the measurement of the cross interference of the left eye image is illustrated in Table 1.

TABLE 1

Measurements of the cross interference of the left eye image
Cross interference of the left eye image (test point: Pi) %

| | | Right eye image | | | | |
|---|---|---|---|---|---|---|
| | | 0% | 25% | 50% | 75% | 100% |
| Left eye image | 0% | | $X_{Gi,RtoL,0-25}$ | $X_{Gi,RtoL,0-50}$ | $X_{Gi,RtoL,0-75}$ | $X_{Gi,RtoL,0-100}$ |
| | 25% | $X_{Gi,RtoL,25-0}$ | | $X_{Gi,RtoL,25-50}$ | $X_{Gi,RtoL,25-75}$ | $X_{Gi,RtoL,25-100}$ |
| | 50% | $X_{Gi,RtoL,50-0}$ | $X_{Gi,RtoL,50-25}$ | | $X_{Gi,RtoL,50-75}$ | $X_{Gi,RtoL,50-100}$ |
| | 75% | $X_{Gi,RtoL,75-0}$ | $X_{Gi,RtoL,75-25}$ | $X_{Gi,RtoL,75-50}$ | | $X_{Gi,RtoL,75-100}$ |
| | 100% | $X_{Gi,RtoL,100-0}$ | $X_{Gi,RtoL,100-25}$ | $X_{Gi,RtoL,100-50}$ | $X_{Gi,RtoL,100-75}$ | |
| | | Absolute average value | | | | $X_{Gi,RtoL}$ |

It is seen from the above description that, according to the above method, in order to measure the cross interference of the left and right eyes of the stereo display system, it is necessary to measure the brightness of respective test point by means of the optical measuring device, and the measurement values are subjected to a large number of calculation before getting the final testing result.

Figure 3:
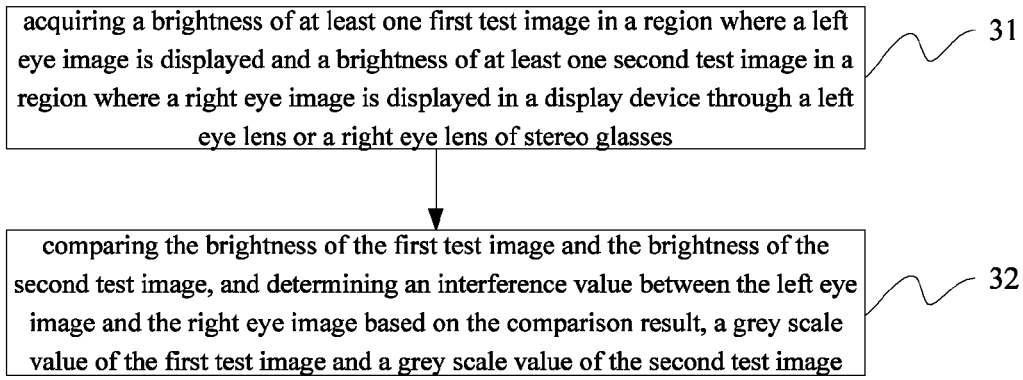
FIG. 3 is a flow chart of a testing method of the 3D display cross interference according to an embodiment of the present disclosure.

The embodiment of the present disclosure provides a testing method of a 3D display cross interference. As illustrated in FIG. 3, the testing method comprises the following steps.

In step 31, a brightness of at least one first test image in a region where a left eye image is displayed in a display device and a brightness of at least one second test image in a region where a right eye image is displayed in the display device are required through a left eye lens or a right eye lens of stereo glasses.

Specifically, in a case where a cross interference of the left eye image to the right eye image is tested, the brightness of the at least one first test image in the region where the left eye image is displayed in the display device and the brightness of the at least one second test image in the region where the right eye image is displayed in the display device are acquired through the left eye lens of the stereo glasses. In a case where a cross interference of the right eye image to the left eye image is tested, the brightness of the at least one first test image in the region where the left eye image is displayed in the display device and the brightness of the at least one second test image in the region where the right eye image is displayed in the display device are acquired through the left eye lens of the stereo glasses.

In step 32, the brightness of the acquired first test image and the brightness of the acquired second test image are compared, and a cross interference value or a cross interference value range between the left eye image and the right eye image are determined according to the comparison result, a grey scale value of the first test image and a grey scale value of the second test image.

No large amount of data operation is needed in the embodiment of the present disclosure. The cross interference value or the cross interference value range between the left eye image and the right eye image of the stereo display system can be tested quickly and it can be determined whether the cross interference value or the cross interference value range between the left eye image and the right eye image of the stereo display system meets the specification, thereby enhancing the processing speed and efficiency of the cross interference test. It is suitable to perform the cross interference test for each stereo display system during mass production.

In an embodiment of the present disclosure, the number of the first test image and the second test image is not limited. One first test image can correspond to one second test image, or one first test image can correspond to a plurality of second test images, or a plurality of first test images can only correspond to one second test image.

It is noted that the method according to the embodiment of the present disclosure can also be used to perform a cross interference test for a 3D signal source in a time division mode.

In a first example, one first test image corresponds to one second test image and both first test image and the second test image corresponding to the first test image are line shape image or bar shape image with a single grey scale.

In an example, for the convenience of comparing the first test image and the corresponding second test image, for example, each first test image and the second test image corresponding to the first test image are arranged side by side and adjacent to each other in a same horizontal direction.

For example, the first test image has a length in a vertical direction equal to that of the second test image corresponding to the first test image in the vertical direction.

It is noted that in the first example, when the cross interference test of the display system is performed, only one test group can be configured. The test group includes one first test image and one corresponding second test image. In order to test the cross interference values at different positions of the display system, a plurality of test groups at different positions can be configured with each test group including one first test image and one second test image corresponding to the first test image. Further, in a case where the plurality of test groups are configured, the grey scales of the first test images in different test groups can be the same or different. Correspondingly, the grey scales of the second test images in different test groups can be the same or different. For example, when the cross interference test of the display system is performed, a plurality of test groups are configured, the first test images in different test groups have the same grey scale and the second test images in different test groups have the same grey scale.

The method according to the above first example is suitable to determine whether the cross interference value or the cross interference value range meets the spec. The grey scales of the first test image and the corresponding second test image can be configured according to the spec. For example, the cross interference value of the stereo display system is required to be no more than 5%. In case where the cross interference of the left eye image to the right eye image is tested, for example, the grey scale of the left eye image (that is, the first test image) is M and the grey scale of the right eye image (that is, the second test image) is N, $$\frac{N}{M} \times 100\% = 5\%$$

is satisfied between M and N.

In a second example, in case where a cross interference of the left eye image to the right eye image is tested, one first test image corresponds to a plurality of second test images, each first test image is a bar shape image with a single grey scale, each second test image in the plurality of second test images corresponding to the first test image is a bar shape image with a single grey scale different from each other. That is, each first test image corresponds to a group of the second test images, each second test image in each group of the second test images has a different grey scale value, and each second test image in the group is a bar shape image with a single grey scale.

In case where a cross interference of the right eye image to the left eye image is tested, one second test image corresponds to a plurality of first test images, each second test image is a bar shape image with a single grey scale, each first test image in the plurality of first test images corresponding to the second test image is a bar shape image with a single grey scale different from each other. That is, each second test image corresponds to a group of the first test images, each first test image in each group of the first test images has a different grey scale value, and each first test image in the group is a bar shape image with a single grey scale.

In the second example, for the convenience of comparing the first test image and the corresponding second test image, for example, in case where the cross interference of the left eye image to the right eye image is tested, the plurality of second test images corresponding to the first test image are arranged side by side and adjacent to each other in a same vertical direction, and each first test image and the plurality of second test images corresponding to the first test image are arranged side by side and adjacent to each other in a same horizontal direction, the first test image has a length in the vertical direction equal to a sum of lengths of the plurality of second test images corresponding to the first test image in the vertical direction. For example, in case where the cross interference of the right eye image to the left eye image is tested, the plurality of first test images corresponding to the second test image are arranged side by side and adjacent to each other in a same vertical direction, and each second test image and the plurality of first test images corresponding to the second test image are arranged side by side and adjacent to each other in a same horizontal direction, the second test image has a length in the vertical direction equal to a sum of lengths of the plurality of first test images corresponding to the second test image in the vertical direction.

In the second example, in case where the cross interference of the left eye image to the right eye image is tested, the brightness of the acquired first test image and each second test image in the plurality of second test images are compared respectively, and a plurality of cross interference values from the left eye image to the right eye image are determined according to the comparison result, the grey scale value of the first test image and various grey scale values of the second test images corresponding to the first test image, and a final cross interference value or a final cross interference value range is determined according to the plurality of cross interference values. In case where the cross interference of the right eye image to the left eye image is tested, the brightness of the acquired second test image and each first test image in the plurality of first test images are compared respectively, and a plurality of cross interference values from the right eye image to the left eye image are determined according to the comparison result, the grey scale value of the second test image and various grey scale values of the first test images corresponding to the second test image, and a final cross interference value or a final cross interference value range is determined according to the plurality of cross interference values.

It is noted that in the second example, when the cross interference test of the display system is performed, only one test group is configured. The test group includes one first test image and the corresponding plurality of second test images. In order to test the cross interference values at different positions of the display system, a plurality of test groups at different positions can be configured with each test group including one first test image and a plurality of second test images corresponding to the first test image. Further, in case where the plurality of test groups are configured, the grey scales of the first test images in different test groups can be the same or different. Correspondingly, the grey scales of the second test images in different test groups can be the same or different. For example, when the cross interference test of the display system is performed, a plurality of test groups are configured, the first test images in different test groups have the same grey scale and the plurality of second test images in different test groups have the same grey scale.

The method according to the above second example is suitable to determine a more accurate cross interference value or the cross interference value range of the display system.

In the embodiment of the present disclosure, during the test, a background image other than the first test image and the second test image in the display system can be displayed as either black (that is, the background of the first test image and the second test image is normal black) or white (that is, the background of the first test image and the second test image is normal white).

For example, during the test, the background image other than the first test image and the second test image in the display system is displayed as black.

In the embodiment of the present disclosure, according to the testing method of the above two examples, a process of testing the cross interference of the left eye image to the right eye image and testing the cross interference of the right eye image to the left eye image are specified as below.

(1) Testing the Cross Interference of the Left Eye Image to the Right Eye Image

For example, in step 31, a brightness of each one first test image in a region where a left eye image is displayed in a display device and a brightness of at least one second test image in the region where a right eye image is displayed corresponding to the first test image in a display device are acquired through a right eye lens of stereo glasses.

For example, in step 32, for the one first test image and each second test image corresponding to the first test image, the cross interference value or cross interference value range between the left eye image and the right eye image is determined. The step includes: in case where the brightness of the first test image is higher than that of the second test image (that is, the first test image acquired through the right eye lens is brighter than the second test image acquired through the right eye lens), the cross interference value from the left eye to the right eye image is determined as being greater than $$\frac{N}{M}\%;$$

in case where the brightness of the first test image is equal to that of the second test image (that is, the first test image acquired through the right eye lens is as bright as the second test image acquired through the right eye lens), the cross interference value from the left eye to the right eye image is determined as being equal to $$\frac{N}{M}\%;$$

in case where the brightness of the first test image is lower than that of the second test image (that is, the first test image acquired through the right eye lens is darker than the second test image acquired through the right eye lens), the cross interference value from the left eye to the right eye image is determined as being smaller than $$\frac{N}{M}\%.$$

In the example, M is the grey scale of the first test image; N is the grey scale of any one of the second test images corresponding to the first test image, and M≥N. The specific values of M and N are related to the number of bits of the grey scale in the display system. For example, in case where the grey scale of the system has 8 bits, then 0<M≤255 and 0<N≤255. For example, in case where the grey scale of the system has 10 bits, then 0<M≤1023 and 0<N≤1023.

In the example, in case where one first test image corresponds to a plurality of second test images (that is, as in the above second example), firstly, the brightness of the one first test image and the brightness of each second test image corresponding to the first test image are compared, and a plurality of values of the cross interference of the left eye image to the right eye image are determined according to the comparison result, the grey scale value of the first test image and the grey scale value of the second test image; then the final cross interference value or the final cross interference value range of the left eye image to the right eye image is determined according to the plurality of cross interference values.

For example, in a case where the cross interference of the left eye image to the right eye image is tested, in case where one first test image corresponds to two second test images, assuming that the grey scale value of the first test image A1 is 255 (assuming that the grey scale of 255 corresponds to a 100% brightness), the grey scale value of one second test images B1 corresponding to the first test image is 8 (that is, N/M=3%), the grey scale value of the other second test images B2 corresponding to the first test image is 10 (that is, N/M=4%), then:

1. in case where the test result is: the brightness of the second test image B1 acquired through the right eye lens is lower than that of the first test image A1 and the brightness of the second test image B2 acquired through the right eye lens is higher than that of the first test image A1, then the cross interference of the left eye image to the right eye image is higher than 3% and lower than 4%;

2. in case where the test result is: the brightness of the second test image B1 acquired through the right eye lens is lower than that of the first test image A1 and the brightness of the second test image B2 acquired through the right eye lens is lower than that of the first test image A1, then the cross interference of the left eye image to the right eye image is higher than 4%;

3. in case where the test result is: the brightness of the second test image B1 acquired through the right eye lens is higher than that of the first test image A1 and the brightness of the second test image B2 acquired through the right eye lens is higher than that of the first test image A1, then the cross interference of the left eye image to the right eye image is lower than 3%.

(2) Testing the Cross Interference of the Right Eye Image to the Left Eye Image

For example, in step 31, a brightness of each one second test image in a region where a right eye image is displayed in a display device and a brightness of at least one first test image in the region where a left eye image is displayed corresponding to the second test image in a display device are acquired through a left eye lens of stereo glasses.

For example, in step 32, for the one second test image and each first test image corresponding to the second test image, the cross interference value or cross interference value range between the left eye image and the right eye image is determined. In particular, the step comprises: in case where the brightness of the first test image is higher than that of the second test image (that is, the first test image acquired through the left eye lens is brighter than the second test image acquired through the left eye lens), the cross interference value from the left eye to the right eye image is determined as being greater than $$\frac{M}{N}\%;$$

in case where the brightness of the first test image is equal to that of the second test image (that is, the first test image acquired through the left eye lens is as bright as the second test image acquired through the left eye lens), the cross interference value from the left eye to the right eye image is determined as being equal to $$\frac{M}{N}\%;$$

in case where the brightness of the first test image is lower than that of the second test image (that is, the first test image acquired through the left eye lens is darker than the second test image acquired through the left eye lens), the cross interference value from the left eye to the right eye image is determined as being smaller than $$\frac{M}{N}\%.$$

In the example, M is the grey scale of the first test image; N is the grey scale of any of the second test image corresponding to the first test image, and M≤N. The specific values of M and N are related to the number of bits of the grey scale of the display system. For example, in case where the grey scale of the system has 8 bits, then 0<M≤255 and 0<N≤255; in case where the grey scale of the system has 10 bits, then 0<M≤1023 and 0<N≤1023.

In the example, in case where one second test image corresponds to a plurality of first test images (that is, as in the above second example), firstly, the brightness of the one second test image and the brightness of each first test image corresponding to the second test image are compared, and a plurality of values of the cross interference of the right eye image to the left eye image are determined according to the comparison result, the grey scale value of the first test image and the grey scale value of the second test image; then the final cross interference value or the final cross interference value range of the right eye image to the left is determined according to the plurality of cross interference values.

For example, in a case where the cross interference of the right eye image to the left eye image is tested, in case where one second test image corresponds to two first test images, assuming that the grey scale value of the second test image A1 is 255 (assuming that the grey scale 255 corresponds to a 100% brightness), the grey scale value of one of the first test images B1 corresponding to the second test image is 8 (that is, N/M=3%), the grey scale value of the other of the first test images B2 corresponding to the second test image is 10 (that is, N/M=4%), then:

1. in case where the test result is: the brightness of the first test image B1 acquired through the left eye lens is lower than that of the second test image A1 and the brightness of the first test image B2 acquired through the left eye lens is higher than that of the first test image A1, then the cross interference of the right eye image to the left eye image is higher than 3% and lower than 4%;

2. in case where the test result is: the brightness of the first test image B1 acquired through the left eye lens is lower than that of the second test image A1 and the brightness of the first test image B2 acquired through the left eye lens is lower than that of the first test image A1, then the cross interference of the right eye image to the left eye image is higher than 4%;

3. in case where the test result is: the brightness of the first test image B1 acquired through the left eye lens is higher than that of the second test image A1 and the brightness of the first test image B2 acquired through the left eye lens is higher than that of the first test image A1, then the cross interference of the right eye image to the left eye image is lower than 3%.

The test of the cross interference of the right eye image to the left eye image is illustrated below by the example that the background image other than the first test image and the second test image in the display system is displayed as black. The test of the cross interference of the left eye image to the right eye image and the test of the cross interference between the left eye image and the right eye image when the background image in the display system is displayed as white are similar to the above tests, which are not described in details herein.

First Embodiment

The left eye image and the right eye image are configured to have a line shape extending in a horizontal direction. It is assumed that the cross interference spec of the stereo display system is 5% (that is, the cross interference of the left eye image to the right eye image is lower than 5% and the cross interference of the right eye image to the left eye image is lower than 5%). For example, it is assumed that the brightness of the measuring side (right eye image) is a brightness defined as an input signal of 100% brightness where the grey scale is 255. The driving signal for the right eye image (that is, the second test image) is configured as a signal having a grey scale of 255. The left eye image is the cross interference side. The cross interference of the right eye image to the left eye image (that is, the first test image) is tested.

Figure 4:
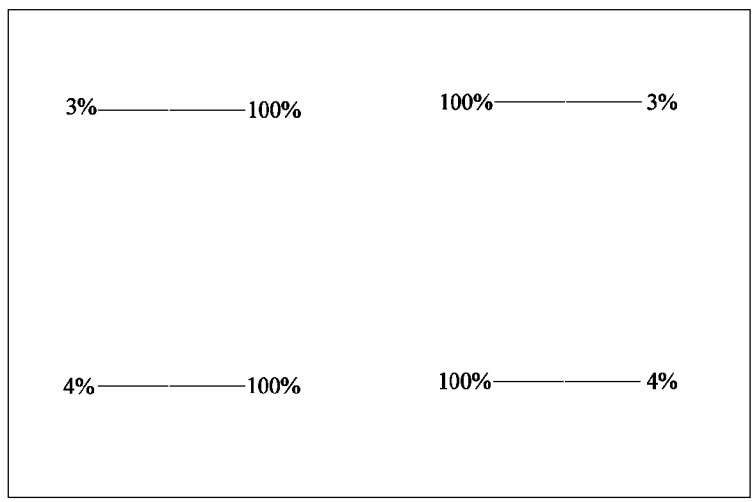
FIG. 4 are schematic views of a left eye test image and a right eye test image according to a first embodiment of the present disclosure.

During the test, the driving signal for driving the left eye image is configured as a signal having a grey scale ratio of 3% and 4%, respectively. Each adjacent left eye image and right eye image form a test group. The left eye image and the right eye image in the test group are adjacent to each other in a horizontal line so as to facilitate the comparison of a the brightness of the left eye image and the right eye image acquired through the left eye lens of the stereo glasses, as illustrated in FIG. 4.

During the test, the brightness of the left eye image and the right eye image acquired through the left eye lens of the stereo glasses is qualitatively compared. In case where the brightness of the acquired right eye image is higher than that of the acquired left eye image having a grey scale ratio of 4%, the cross interference of the right eye image to the left eye image is higher than 4%; in case where the brightness of the acquired right eye image is lower than that of the acquired left eye image having a grey scale ratio of 3%, the cross interference of the right eye image to the left eye image is lower than 3%.

Assuming that the brightness of the acquired right eye image is higher than that of the acquired left eye image having a grey scale ratio of 3% and the brightness of the acquired right eye image is lower than that of the acquired left eye image having a grey scale ratio of 4%, the cross interference of the right eye image to the left eye image is between 3%~4%.

In the method, in order to determine whether the stereo display system meets the configured spec (that is, 5%), the driving signal for the right eye image is configured as a signal having a grey scale of 255 and the driving signal for the left eye image is configured as a signal having a grey scale ratio of 5%.

During the test, the brightness of the left eye image and the right eye image acquired through the left eye lens of the stereo glasses is qualitatively compared. In case where the brightness of the acquired right eye image is higher than that of the acquired left eye image having a grey scale ratio of 5%, the cross interference of the right eye image to the left eye image is higher than 5%, that is, the stereo display system does not meet the spec; in case where the brightness of the acquired right eye image is lower than that of the acquired left eye image having a grey scale ratio of 5%, the cross interference of the right eye image to the left eye image is lower than 5%, that is, the stereo display system is qualified.

Second Embodiment

Figure 5:
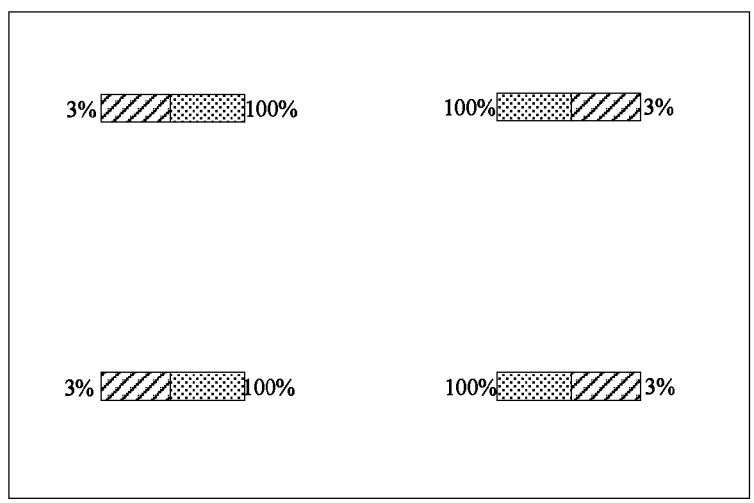
FIG. 5 are schematic views of a left eye test image and a right eye test image according to a second embodiment of the present disclosure.

The left eye image and the right eye image are configured to have a bar shape extending in a horizontal direction. The driving signal for the right eye image is configured as a signal for a bar shape having a grey scale of 255 and the driving signal for the left eye image is configured as a signal for a bar shape having a grey scale ratio of 3%. Each adjacent left eye image and right eye image form a test group. The left eye image and the right eye image in the test group are adjacent to each other in a horizontal line so as to facilitate the comparison of the brightness of the left eye image and the right eye image acquired through the left eye lens of the stereo glasses, as illustrated in FIG. 5. Other aspects of the embodiment are similar to that of the above first embodiment, which is not described in details herein.

Third Embodiment

Figure 6:
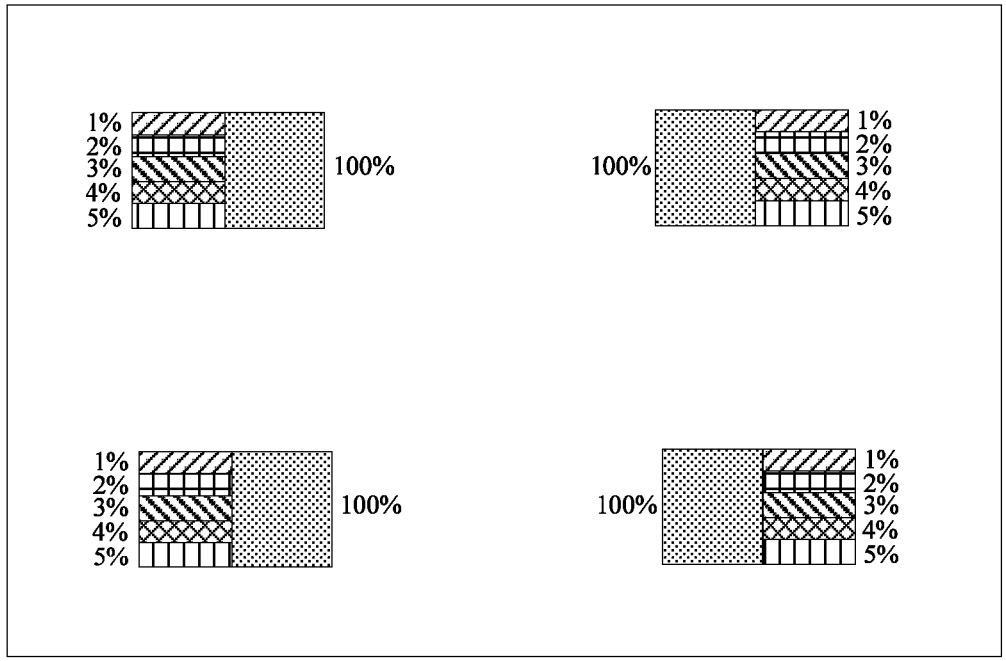
FIG. 6 are schematic views of a left eye test image and a right eye test image according to a third embodiment of the present disclosure.

In order to determine the value range of the cross interference between the left eye image and the right eye image of the stereo display system through the cross interference test, one right eye image corresponds to a plurality of left eye images. The driving signals for left eye images are configured as signals having different grey scale values. The plurality of left eye images and the right eye image are configured to have a bar shape extending in a horizontal line, and the group consisted of the plurality of left eye images and the right eye image are adjacent to each other aligned along a horizontal line. As illustrated in FIG. 6, the driving signal for the right eye image is configured as a signal having a grey scale of 255 and the driving signals for the left eye images are configured as a signal having a grey scale ratio of 1%, 2%, 3%, 4% and 5%, respectively. Other aspects of the embodiment are similar to that of the above first embodiment, which is not described in details herein.

Figure 7:
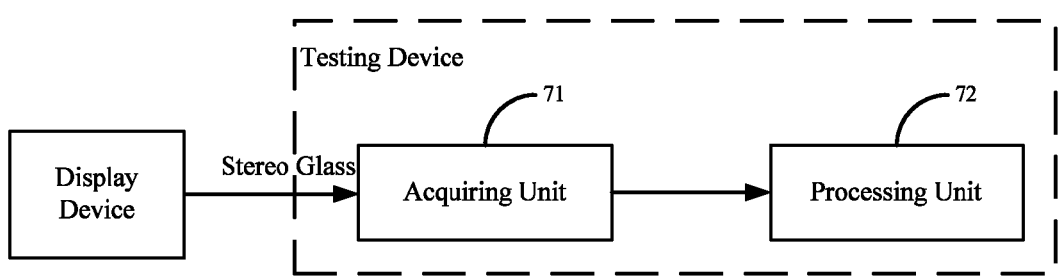
FIG. 7 is a structural schematic view of a testing device of 3D display cross interference according to an embodiment of the present disclosure.

The embodiment of the present disclosure further provides a testing device of a 3D display cross interference using the above testing method. As illustrated in FIG. 7, the testing device of the 3D display cross interference according to an embodiment of the present disclosure comprises: an acquiring unit 71, for acquiring a brightness of at least one first test image in a region where a left eye image is displayed in a display device and a brightness of at least one second test image in the region where a right eye image is displayed in a display device through a left eye lens or a right eye lens of stereo glasses; and a processing unit 72, for comparing the brightness of the acquired first test image and the brightness of the acquired second test image and determining a cross interference value or a cross interference value range between the left eye image and the right eye image according to the comparison result, a grey scale value of the first test image and a grey scale value of the second test image.

In a first example, one first test image corresponds to one second test image, and both first test image and the second test image corresponding to the first test image are line shape image or bar shape image with a single grey scale.

In the above example, each first test image and the second test image corresponding to the first test image are arranged side by side and adjacent to each other in a same horizontal direction.

In a second example, in case where a cross interference of the left eye image to the right eye image is tested, one first test image corresponds to a plurality of second test images. Each first test image is a bar shape image with a single grey scale. Each second test image in the plurality of second test images corresponding to the first test image is a bar shape image with a single grey scale different from each other. In case where a cross interference of the right eye image to the left eye image is tested, the one second test image corresponds to a plurality of first test images, each second test image is a bar shape image with a single grey scale, each first test image in the plurality of first test images corresponding to the second test image is a bar shape image with a single grey scale different from each other.

In the above second example, in case where the cross interference of the left eye image to the right eye image is tested, the plurality of second test images corresponding to the first test image are arranged side by side and adjacent to each other in a same vertical direction, and each first test image and the plurality of second test images corresponding to the first test image are arranged side by side and adjacent to each other in a same horizontal direction, the first test image has a length in the vertical direction equal to a sum of lengths of the plurality of second test images corresponding to the first test image in the vertical direction. In case where the cross interference of the right eye image to the left eye image is tested, the plurality of first test images corresponding to the second test image are arranged side by side and adjacent to each other in a same vertical direction, and each second test image and the plurality of first test images corresponding to the second test image are arranged side by side and adjacent to each other in a same horizontal direction, the second test image has a length in the vertical direction equal to a sum of lengths of the plurality of first test images corresponding to the second test image in the vertical direction.

In the above second example, in case where the cross interference of the left eye image to the right eye image is tested, the processing unit 72 is designed as following. The brightness of the acquired first test image and each second test image in the plurality of second test images are compared respectively, and a plurality of cross interference values from the left eye image to the right eye image are determined according to the comparison results. The grey scale value of the first test image and various grey scale values of the second test images corresponding to the first test image, and a final cross interference value or a final cross interference value range is determined according to the plurality of cross interference values.

In case where the cross interference of the right eye image to the left eye image is tested, the processing unit 72 is designed as following. The brightness of the acquired second test image and each first test image in the plurality of first test images are compared respectively, and a plurality of cross interference values from the right eye image to the left eye image are determined according to the comparison results. The grey scale value of the second test image and various grey scale values of the first test images corresponding to the second test image, and a final cross interference value or a final cross interference value range is determined according to the plurality of cross interference values.

In the embodiment of the present disclosure, during the test, the background image other than the first test image and the second test image in the display system can be displayed as either black (that is, the background of the first test image and the second test image is normal black) or white (that is, the background of the first test image and the second test image is normal white).

For example, during the test, the background image other than the first test image and the second test image in the display system is displayed as black.

Based on the above two examples, in case where the cross interference of the left eye image to the right eye image is tested, for the one first test image and each second test image corresponding to the first test image, determining cross interference value or cross interference value range between the left eye image and the right eye image includes: in case where the brightness of the first test image is higher than that of the second test image, the cross interference value from the left eye to the right eye image is determined as being greater than $$\frac{N}{M}\%;$$

in case where the brightness of the first test image is equal to that of the second test image, the cross interference value from the left eye to the right eye image is determined as being equal to $$\frac{N}{M}\%;$$

in case where the brightness of the first test image is lower than that of the second test image, the cross interference value from the left eye to the right eye image is determined as being smaller than $$\frac{N}{M}\%,$$

where M is the grey scale value of the first test image, N is the grey scale value of the second test image and M≥N.

In case where the cross interference of the right eye image to the left eye image is tested, for the one second test image and each first test image corresponding to the second test image, determining cross interference value or cross interference value range between the left eye image and the right eye image includes: in case where the brightness of the first test image is higher than that of the second test image, the cross interference value from the left eye to the right eye image is determined as being smaller than $$\frac{M}{N}\%;$$

in case where the brightness of the first test image is equal to that of the second test image, the cross interference value from the left eye to the right eye image is determined as being equal to $$\frac{M}{N}\%;$$

in case where the brightness of the first test image is lower than that of the second test image, the cross interference value from the left eye to the right eye image is determined as being greater than $$\frac{M}{N}\%,$$

where M is the grey scale value of the first test image, N is the grey scale value of the second test image and M≤N.

The above embodiments are only used to illustrate but not to limit the present disclosure. Those skilled in the art can make various change and modification without departing from the spirit and scope of the present disclosure. Therefore, all equivalent technical solutions belong to the scope of the present disclosure. The scope of the claimed present disclosure is defined by the appended claims.

The present application claims the priority of the Chinese patent application No. 201310741665.3 filed on Dec. 27, 2013, which is incorporated as part of the present application by reference herein in its entirety.

What is claimed is:

1. A testing method of a 3D display cross interference, comprising:
   acquiring a brightness of at least one first test image in a region where a left eye image is displayed in a display device and a brightness of at least one second test image in a region where a right eye image is displayed in a display device through one of a left eye lens and a right lens of stereo glasses;
   comparing the brightness of the acquired first test image and the brightness of the acquired second test image, and determining a cross interference value or a cross interference value range between the left eye image and the right eye image according to the comparison result, a grey scale value of the first test image and a grey scale value of the second test image,
   wherein the at least one first test image and the at least one second test image are simultaneously displayed in the display device.

2. The method of claim 1, wherein one first test image corresponds to one second test image, and both first test image and the second test image corresponding to the first test image are line shape image or bar shape image with a single grey scale.

3. The method of claim 2, wherein the first test image and the second test image corresponding to the first test image are arranged side by side and adjacent to each other in a same horizontal direction.

4. The method of claim 1, wherein in case where a cross interference of the left eye image to the right eye image is tested, one first test image corresponds to a plurality of second test images, each first test image is a bar shape image with a single grey scale, each second test image in the plurality of second test images corresponding to the first test image is a bar shape image with a single grey scale different from each other;
   in case where a cross interference of the right eye image to the left eye image is tested, one second test image corresponds to a plurality of first test images, each second test image is a bar shape image with a single grey scale, each first test image in the plurality of first test images corresponding to the second test image is a bar shape image with a single grey scale different from each other.

5. The method of claim 4, wherein in case where the cross interference of the left eye image to the right eye image is tested, the plurality of second test images corresponding to the first test image are arranged side by side and adjacent to each other in a same vertical direction, and each first test image and the plurality of second test images corresponding to the first test image are arranged side by side and adjacent to each other in a same horizontal direction, the first test image has a length in the vertical direction equal to a sum of lengths of the plurality of second test images corresponding to the first test image in the vertical direction;

in case where the cross interference of the right eye image to the left eye image is tested, the plurality of first test images corresponding to the second test image are arranged side by side and adjacent to each other in a same vertical direction, and each second test image and the plurality of first test images corresponding to the second test image are arranged side by side and adjacent to each other in a same horizontal direction, the second test image has a length in the vertical direction equal to a sum of lengths of the plurality of first test images corresponding to the second test image in the vertical direction.

6. The method of claim 4, wherein, in case where the cross interference of the left eye image to the right eye image is tested, the brightness of the acquired first test image and each second test image in the plurality of second test images are compared respectively, and a plurality of cross interference values from the left eye image to the right eye image are determined according to the comparison result, the grey scale value of the first test image and a various grey scale values of the second test images corresponding to the first test image, and a final cross interference value or a final cross interference value range of the left eye image to the right eye image is determined according to the plurality of cross interference values;

in case where the cross interference of the right eye image to the left eye image is tested, the brightness of the acquired second test image and each first test image in the plurality of first test images are compared respectively, and a plurality of cross interference values from the right eye image to the left eye image are determined according to the comparison result, the grey scale value of the second test image and various grey scale values of the first test images corresponding to the second test image, and a final cross interference value or a final cross interference value range of the right eye image to the left eye image is determined according to the plurality of cross interference values.

7. The method of claim 1, wherein in case where the cross interference of the left eye image to the right eye image is tested, for the one first test image and each second test image corresponding to the first test image, determining cross interference value or cross interference value range between the left eye image and the right eye image includes: in case where the brightness of the first test image is higher than that of the second test image, the cross interference value from the left eye to the right eye image is determined as being greater than $$\frac{N}{M}\%;$$

in case where the brightness of the first test image is equal to that of the second test image, the cross interference value from the left eye to the right eye image is determined as being equal to $$\frac{N}{M}\%;$$

in case where the brightness of the first test image is lower than that of the second test image, the cross interference value from the left eye to the right eye image is determined as being smaller than $$\frac{N}{M}\%,$$

where M is the grey scale value of the first test image, N is the grey scale value of the second test image and M≥N;

in case where the cross interference of the right eye image to the left eye image is tested, for the one second test image and each first test image corresponding to the second test image, determining cross interference value or cross interference value range between the left eye image and the right eye image includes: in case where the brightness of the first test image is higher than that of the second test image, the cross interference value from the left eye to the right eye image is determined as being smaller than $$\frac{M}{N}\%;$$

in case where the brightness of the first test image is equal to that of the second test image, the cross interference value from the left eye to the right eye image is determined as being equal to $$\frac{M}{N}\%;$$

in case where the brightness of the first test image is lower than that of the second test image, the cross interference value from the left eye to the right eye image is determined as being greater than $$\frac{M}{N}\%,$$

where M is the grey scale value of the first test image, N is the grey scale value of the second test image and M≤N.

8. A testing device of a 3D display cross interference, comprising:

an optical measuring device for acquiring a brightness of at least one first test image in a region where a left eye image is displayed in a display device and a brightness of at least one second test image in a region where a right eye image is displayed in the display device through one of a left eye lens and a right eye lens of stereo glasses; and a processing unit for comparing the brightness of the acquired first test image and the brightness of the acquired second test image and determining a cross interference value or a cross interference value range between the left eye image and the right eye image according to the comparison result, a grey scale value of the first test image and a grey scale value of the second test image, wherein the at least one first test image and the at least one second test image are simultaneously displayed in the display device.

9. The device of claim 8, wherein one first test image corresponds to one second test image, and both each first test image and the second test image corresponding to the first test image are line shape image or bar shape image with a single grey scale.

10. The device of claim 9, wherein each first test image and the second test image corresponding to the first test image are arranged side by side and adjacent to each other in a same horizontal direction.

11. The device of claim 8, wherein in case where a cross interference of the left eye image to the right eye image is tested, the one first test image corresponds to a plurality of second test images, each first test image is a bar shape image with a single grey scale, each second test image in the plurality of second test images corresponding to the first test image is a bar shape image with a single grey scale different from each other;

in case where a cross interference of the right eye image to the left eye image is tested, the one second test image corresponds to a plurality of first test images, each second test image is a bar shape image with a single grey scale, each first test image in the plurality of first test images corresponding to the second test image is a bar shape image with a single grey scale different from each other.

12. The device of claim 11, wherein in case where the cross interference of the left eye image to the right eye image is tested, the plurality of second test images corresponding to the first test image are arranged side by side and adjacent to each other in a same vertical direction, and each first test image and the plurality of second test images corresponding to the first test image are arranged side by side and adjacent to each other in a same horizontal direction, the first test image has a length in the vertical direction equal to a sum of lengths of the plurality of second test images corresponding to the first test image in the vertical direction;

in case where the cross interference of the right eye image to the left eye image is tested, the plurality of first test images corresponding to the second test image are arranged side by side and adjacent to each other in a same vertical direction, and each second test image and the plurality of first test images corresponding to the second test image are arranged side by side and adjacent to each other in a same horizontal direction, the second test image has a length in the vertical direction equal to a sum of lengths of the plurality of first test images corresponding to the second test image in the vertical direction.

13. The device of claim 11, wherein, in case where the cross interference of the left eye image to the right eye image is tested, the processing unit is so designed that the brightness of the acquired first test image and each second test image in the plurality of second test images are compared respectively, and a plurality of cross interference values of the left eye image to the right eye image are determined according to the comparison result, the grey scale value of the first test image and various grey scale values of the second test images corresponding to the first test image, and a final cross interference value or a final cross interference value range of the left eye image to the right eye image is determined according to the plurality of cross interference values;

in case where the cross interference of the right eye image to the left eye image is tested, the processing unit is so designed that the brightness of the acquired second test image and each first test image in the plurality of first test images are compared respectively, and a plurality of cross interference values of the right eye image to the left eye image are determined according to the comparison result, the grey scale value of the second test image and various grey scale values of the first test images corresponding to the second test image, and a final cross interference value or a final cross interference value range of the right eye image to the left eye image is determined according to the plurality of cross interference values.

14. The device of claim 8, wherein in case where the cross interference of the left eye image to the right eye image is tested, for the one first test image and each second test image corresponding to the first test image, the processing unit is so designed that: in case where the brightness of the first test image is higher than that of the second test image, the cross interference value from the left eye to the right eye image is determined as being greater than $$\frac{N}{M}\%;$$

in case where the brightness of the first test image is equal to that of the second test image, the cross interference value from the left eye to the right eye image is determined as being equal to $$\frac{N}{M}\%;$$

in case where the brightness of the first test image is lower than that of the second test image, the cross interference value from the left eye to the right eye image is determined as being smaller than $$\frac{N}{M}\%,$$

where M is the grey scale value of the first test image, N is the grey scale value of the second test image and M≥N.

15. The device of claim 8, wherein in case where the cross interference of the right eye image to the left eye image is tested, for the one second test image and each first test image corresponding to the second test image, the processing unit is so designed that: in case where the brightness of the first test image is higher than that of the second test image, the cross interference value from the left eye to the right eye image is determined as being smaller than $$\frac{M}{N}\%;$$

in case where the brightness of the first test image is equal to that of the second test image, the cross interference value from the left eye to the right eye image is determined as being equal to $$\frac{M}{N}\%;$$

in case where the brightness of the first test image is lower than that of the second test image, the cross interference value from the left eye to the right eye image is determined as being greater than $$\frac{M}{N}\%,$$

where M is the grey scale value of the first test image, N is the grey scale value of the second test image and M≤N.

16. The method of claim 2, wherein in case where the cross interference of the left eye image to the right eye image is tested, for the one first test image and each second test image corresponding to the first test image, determining cross interference value or cross interference value range between the left eye image and the right eye image includes: in case where the brightness of the first test image is higher than that of the second test image, the cross interference value from the left eye to the right eye image is determined as being greater than $$\frac{N}{M}\%;$$

in case where the brightness of the first test image is equal to that of the second test image, the cross interference value from the left eye to the right eye image is determined as being equal to $$\frac{N}{M}\%;$$

in case where the brightness of the first test image is lower than that of the second test image, the cross interference value from the left eye to the right eye image is determined as being smaller than $$\frac{N}{M}\%,$$

where M is the grey scale value of the first test image, N is the grey scale value of the second test image and M≥N;
  in case where the cross interference of the right eye image to the left eye image is tested, for the one second test image and each first test image corresponding to the second test image, determining cross interference value or cross interference value range between the left eye image and the right eye image includes: in case where the brightness of the first test image is higher than that of the second test image, the cross interference value from the left eye to the right eye image is determined as being smaller than $$\frac{M}{N}\%;$$

in case where the brightness of the first test image is equal to that of the second test image, the cross interference value from the left eye to the right eye image is determined as being equal to $$\frac{M}{N}\%;$$

in case where the brightness of the first test image is lower than that of the second test image, the cross interference value from the left eye to the right eye image is determined as being greater than $$\frac{M}{N}\%,$$

where M is the grey scale value of the first test image, N is the grey scale value of the second test image and M≤N.

17. The method of claim 3, wherein in case where the cross interference of the left eye image to the right eye image is tested, for the one first test image and each second test image corresponding to the first test image, determining cross interference value or cross interference value range between the left eye image and the right eye image includes: in case where the brightness of the first test image is higher than that of the second test image, the cross interference value from the left eye to the right eye image is determined as being greater than $$\frac{N}{M}\%;$$

in case where the brightness of the first test image is equal to that of the second test image, the cross interference value from the left eye to the right eye image is determined as being equal to $$\frac{N}{M}\%;$$

in case where the brightness of the first test image is lower than that of the second test image, the cross interference value from the left eye to the right eye image is determined as being smaller than $$\frac{N}{M}\%,$$

where M is the grey scale value of the first test image, N is the grey scale value of the second test image and M≥N;

in case where the cross interference of the right eye image to the left eye image is tested, for the one second test image and each first test image corresponding to the second test image, determining cross interference value or cross interference value range between the left eye image and the right eye image includes: in case where the brightness of the first test image is higher than that of the second test image, the cross interference value from the left eye to the right eye image is determined as being smaller than $$\frac{M}{N}\%;$$

in case where the brightness of the first test image is equal to that of the second test image, the cross interference value from the left eye to the right eye image is determined as being equal to $$\frac{M}{N}\%;$$

in case where the brightness of the first test image is lower than that of the second test image, the cross interference value from the left eye to the right eye image is determined as being greater than $$\frac{M}{N}\%,$$

where M is the grey scale value of the first test image, N is the grey scale value of the second test image and M≤N.

18. The method of claim 3, wherein in case where the cross interference of the left eye image to the right eye image is tested, for the one first test image and each second test image corresponding to the first test image, determining cross interference value or cross interference value range between the left eye image and the right eye image includes: in case where the brightness of the first test image is higher than that of the second test image, the cross interference value from the left eye to the right eye image is determined as being greater than $$\frac{N}{M}\%;$$

in case where the brightness of the first test image is equal to that of the second test image, the cross interference value from the left eye to the right eye image is determined as being equal to $$\frac{N}{M}\%;$$

in case where the brightness of the first test image is lower than that of the second test image, the cross interference value from the left eye to the right eye image is determined as being smaller than $$\frac{N}{M}\%,$$

where M is the grey scale value of the first test image, N is the grey scale value of the second test image and M≥N;

in case where the cross interference of the right eye image to the left eye image is tested, for the one second test image and each first test image corresponding to the second test image, determining cross interference value or cross interference value range between the left eye image and the right eye image includes: in case where the brightness of the first test image is higher than that of the second test image, the cross interference value from the left eye to the right eye image is determined as being smaller than $$\frac{M}{N}\%;$$

in case where the brightness of the first test image is equal to that of the second test image, the cross interference value from the left eye to the right eye image is determined as being equal to $$\frac{M}{N}\%;$$

in case where the brightness of the first test image is lower than that of the second test image, the cross interference value from the left eye to the right eye image is determined as being greater than $$\frac{M}{N}\%,$$

where M is the grey scale value of the first test image, N is the grey scale value of the second test image and M≤N.

19. The method of claim 4, wherein in case where the cross interference of the left eye image to the right eye image is tested, for the one first test image and each second test image corresponding to the first test image, determining cross interference value or cross interference value range between the left eye image and the right eye image includes: in case where the brightness of the first test image is higher than that of the second test image, the cross interference value from the left eye to the right eye image is determined as being greater than $$\frac{N}{M}\%;$$

in case where the brightness of the first test image is equal to that of the second test image, the cross interference value from the left eye to the right eye image is determined as being equal to $$\frac{N}{M}\%;$$

in case where the brightness of the first test image is lower than that of the second test image, the cross interference value from the left eye to the right eye image is determined as being smaller than $$\frac{N}{M}\%,$$

where M is the grey scale value of the first test image, N is the grey scale value of the second test image and M≥N;

in case where the cross interference of the right eye image to the left eye image is tested, for the one second test image and each first test image corresponding to the second test image, determining cross interference value or cross interference value range between the left eye image and the right eye image includes: in case where the brightness of the first test image is higher than that of the second test image, the cross interference value from the left eye to the right eye image is determined as being smaller than $$\frac{M}{N}\%;$$

in case where the brightness of the first test image is equal to that of the second test image, the cross interference value from the left eye to the right eye image is determined as being equal to $$\frac{M}{N}\%;$$

in case where the brightness of the first test image is lower than that of the second test image, the cross interference value from the left eye to the right eye image is determined as being greater than $$\frac{M}{N}\%,$$

where M is the grey scale value of the first test image, N is the grey scale value of the second test image and M≤N.

20. The method of claim 5, wherein in case where the cross interference of the left eye image to the right eye image is tested, for the one first test image and each second test image corresponding to the first test image, determining cross interference value or cross interference value range between the left eye image and the right eye image includes: in case where the brightness of the first test image is higher than that of the second test image, the cross interference value from the left eye to the right eye image is determined as being greater than $$\frac{N}{M}\%;$$

in case where the brightness of the first test image is equal to that of the second test image, the cross interference value from the left eye to the right eye image is determined as being equal to $$\frac{N}{M}\%;$$

in case where the brightness of the first test image is lower than that of the second test image, the cross interference value from the left eye to the right eye image is determined as being smaller than $$\frac{N}{M}\%,$$

where M is the grey scale value of the first test image, N is the grey scale value of the second test image and M≥N;

In case where the cross interference of the right eye image to the left eye image is tested, for the one second test image and each first test image corresponding to the second test image, determining cross interference value or cross interference value range between the left eye image and the right eye image includes: in case where the brightness of the first test image is higher than that of the second test image, the cross interference value from the left eye to the right eye image is determined as being smaller than $$\frac{M}{N}\%;$$

in case where the brightness of the first test image is equal to that of the second test image, the cross interference value from the left eye to the right eye image is determined as being equal to $$\frac{M}{N}\%;$$

in case where the brightness of the first test image is lower than that of the second test image, the cross interference value from the left eye to the right eye image is determined as being greater than $$\frac{M}{N}\%,$$

where M is the grey scale value of the first test image, N is the grey scale value of the second test image and M≤N.

* * * * *